United States Patent

Ledoux et al.

[15] 3,673,167
[45] June 27, 1972

[54] POLYVINYL CHLORIDE FIBERS

[72] Inventors: Claude Ledous, Antony, Hauts de Seine; Albert De Vries, Chevilly-Larue, Val de Marne, both of France

[73] Assignee: Produits Chimiques Pechiney Saint Gobain, Neuilly sur Seine, France

[22] Filed: Oct. 30, 1969

[21] Appl. No.: 872,560

Related U.S. Application Data

[63] Continuation-in-part of Ser. No. 638,177, April 24, 1967, Pat. No. 3,548,049.

[30] Foreign Application Priority Data

April 27, 1966 France ................................. 6659303
March 3, 1967 France ................................. 6797350
Oct. 9, 1968 France ............................... 68169192

[52] U.S. Cl. ....................... 260/92.8 R, 161/172, 161/177, 260/92.8 AC, 260/897 C, 260/899
[51] Int. Cl. ........................................................... D01d 5/08
[58] Field of Search .................. 161/172, 175, 176, 177, 180, 161/181; 264/210; 260/876, 897, 899, 92.8 A, 92.8 R, 92.8 AC

[56] References Cited

UNITED STATES PATENTS

| 3,078,544 | 2/1963 | Shealy | 161/177 |
| 3,099,067 | 7/1963 | Merriam et al. | 161/171 |
| 3,164,948 | 1/1965 | Stratford | 161/172 |
| 3,320,205 | 5/1967 | Imai et al. | 260/33.6 |
| 3,372,219 | 3/1968 | Gord et al. | 264/210 |
| 3,380,953 | 4/1968 | Fukushima | 161/171 |
| 3,382,305 | 5/1968 | Breen | 161/181 |
| 3,444,269 | 5/1969 | Beer | 260/876 |

OTHER PUBLICATIONS

L. Gord " Polyvinyl Chloride Fibers" from Man–Made Fibers Science and Technology Vol. 3 Mark et al. (eds.) John Wiley & Sons 1968 p. 333
Moncrieff Man Made Fibers (4th ed.) 1963 John Wiley & Sons New York pp. 429– 430
Moncrieff Man Made Fibers Heywood Books: London (1966) pp. 64– 65

Primary Examiner—Robert F. Burnett
Assistant Examiner—Raymond O. Linker, Jr.
Attorney—Dale A. Bauer, John L. Seymour and Bauer and Seymour

[57] ABSTRACT

Vinyl chloride homo- and co-polymers are made which have uniform cross section, homogeneous structure, great brilliance, and good transparency. They are far superior in these properties to any polyvinyl chloride homo- or co-polymers which were previously known. They may have any desired shape in cross section, for instance those of a square or a star.

8 Claims, 4 Drawing Figures

PRIOR ART

INVENTORS
CLAUDE LEDOUX
ALBERT de VRIES

POLYVINYL CHLORIDE FIBERS

This application is a continuation-in-part of application Ser. No. 638,177, filed Apr. 24, 1967 now Pat. No. 3,548,049.

This invention relates to the manufacture of polyvinyl chloride in elongated shapes of uniform section, which had not heretofore been accomplished. Polyvinyl chloride fibers can be made by this process, are of substantial importance, and this invention will be related in its application to their manufacture, it being understood that the process is equally applicable to the manufacture of other shapes the thickness of which is minimum compared to length, for instance ribbons, pellicles, sheets.

Polyvinyl chloride has been made in shaped sizes of limited length by pressing in a mold or by extrusion, but polyvinyl chloride has not been used to make highly flexible sizes of limitless length and minimum section continuously. By limitless is meant to distinguish between objects all the dimensions of which are fixed as made, compared to those of at least one indeterminate dimension.

Heretofore it has been possible to make polyvinyl chloride fibers commercially only by dissolving the resin in a solvent, spinning the solution, and evaporating the solvent, leaving a warped and unequal fiber as viewed against a black background. Such fibers are of unequal strength, are unreproducible, contain solvent voids, and do not have uniform luster when viewed by any kind of light. While the properties of strength and resistance to solvents of polyvinyl chloride theoretically indicate the desirability of polyvinyl chloride fibers, the difficulties attending manufacture have prevented any substantial achievement of that objective. Proposals have been made to melt the fiber and extrude it but have not been attended by success because of the sensitivity of the material to degradation by heat.

It is an object of the invention to make polyvinyl chloride fibers of uniform section, uniform appearance and brilliant luster, transparent when desired, of any chosen cross section such as triangular, circular, elliptical, pellicular, solid or hollow, having the full strength of the material, resistant to solvents such as the chlorinated organic solvents, and to make useful fibers not only of copolymers of vinyl chloride but also of mixtures of these resins with other resins which are normally compatible, and surprisingly, with resins such as the ethylenic and acrylate polymers which were formerly incompatible.

The objects are accomplished generally speaking by polyvinyl chloride in an elongated shape having an indeterminate dimension and a minimum section, the section of which is substantially uniform, and by a method of making a resinous composition from the class consisting of polyvinyl chloride and its copolymers, and their mixtures with compatible and previously incompatible resins into elongated shapes of minimum section which comprises flowing a stream of molten polyvinyl chloride in the absence of solvents and diluents toward shaping means, and homogenizing the stream before its entering into the shaping means, heating the stream rapidly above the temperature of fusion of the crystallites of the resin, which is in the range of about 180° C. to 300° C., when using commercial types of polyvinyl chloride, thereby making it hot and plastic, shaping the hot, plastic resin in the shaping means drawing and cooling it, the heating, shaping, drawing and cooling of the homogeneous resin being limited to a time of the order of a few seconds to tens of seconds.

The new fibers can be extruded, drawn, and made to rigid specifications of uniformity not previously attainable, even to the manufacture of rigorously exact transverse dimensions.

The above and further objects and novel features of the invention will more fully appear from the following detailed description when the same is read in connection with the drawings. It is to be expressly understood, however, that the drawings are for purposes of illustration only and are not intended as a definition of the limits of the invention.

Figure 1:
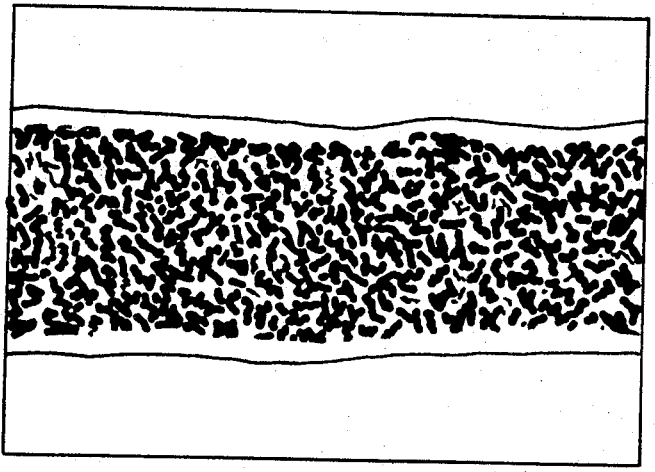
FIG. 1 is a view at 200 diameter enlargement through a phase contrast microscope of a fiber of polyvinyl chloride prepared from solution in accordance with the prior art after such fiber has been spun and swollen.

In the new process the fibers are made from a melt of the resin without the addition of solvent, being extruded from a spinnerette, for example, and drawn as they issue.

All types of polyvinyl chloride are useful in the process, e.g. those polymerized hot, those polymerized cold ; all its copolymers, e.g. polyvinyl chloride/vinylidene chloride, polyvinyl chloride/acrylonitrile ; super chlorinated polyvinyl chloride ; grafted polyvinyl chloride ; and those in which the comonomer is ethylenic or acrylic. Particles of different polymers, e.g. polyvinyl chloride and polyvinylidene chloride can be rapidly homogenized and heated and extruded together, producing useful fibers of coordinate properties.

The process is of extreme rapidity, the completion of homogenization, extrusion drawing and the start of cooling being accomplished in less than a minute. To accomplish this the polyvinyl chloride flows in a stream toward the spinnerette, the stream is homogenized just before the spinnerette by the most vigorous working, which impart a material rise in temperature, is heated to melting temperature either just before the spinnerette, or in or before the die of the spinnerette itself, and is cooled by air or in a liquid. Before it is cooled it may be subjected to drawing. The whole operation will take less than a minute and in many cases only from a few seconds to a few tens of seconds.

The temperatures employed will vary according to the quality (e.g. viscosity and mol weight) of the resin. An exemplary polyvinyl chloride was homogenized, melted, extruded, drawn, and cooled in 15 seconds at a temperature of 200° C. which was attained only for a few seconds.

A new machine has been described in French Pat. No. 1.461.398 and in its first certificate of addition 90.529 and in U.S. Pat. No. 3,411,180 which can be used in the present process.

The standard extrusion apparatus is useful, for instance spinnerettes, usually with the addition of means to heat the spinnerette and the zones immediately adjacent to it through which the homogenized resin flows, to the temperature between 180° and 300° C. or above most useful with the particular resin.

The fiber takes a shape closely corresponding to the shape of the extrusion orifice, e.g. circular, elliptical, lobed, triangular, cruciform. Such shapes could not previously be produced.

The invention not only provides for the formation of such articles from polymers and copolymers but also from mixtures of different polymers and copolymers, even those previously regarded as incompatible, and makes useful articles from them, for instance from mixtures of vinyl resins with olefinic and acrylic types.

The inventors have also found that the method of preparation of such elongated bodies is practised in a facile manner if the gelification and melting of the polymer are carried out at temperatures above 200° C. and within the range, for example, of from 220° to 290° C. and above, but by preference from 230° C. to 260° C. In accordance with this method one obtains thin fibers which have good drawability between 95° and 120° C.; this permits fibers to be drawn down to as low as 2 deniers, such fibers having a good strength and a good resistance to solvents. In such fibers the phase constituted by a vinyl chloride homo-or co-polymer does not present any granular structure which is detectable by optical or electron microscope.

In accordance with the invention the working temperature is chosen as a function of the nature of the vinyl chloride polymers or copolymers, or of the compositions formed of mixtures of such polymers and copolymers and of polymer compositions of the olefin or acrylic ester type.

As an example, we have obtained fibers according to the invention from a homopolymer of vinyl chloride, polymerized in mass and having an Afnor index of viscosity of 80, stabilized with an organostannic compound, by extrusion by means of the apparatus described in French Pat. No. 1,461,398 and in its certificate of addition No. 90.529. Such apparatus was provided with an extrusion head provided with a die plate having 200 circular cylindrical extrusion passages having a diameter of 1mm. The temperature measured with a thermocouple in the mass of molten polymer entering the extrusion head was 245° C., and the temperature of the extrusion head was maintained at 250° C. The polymer leaving the passages in the die plate was drawn at a speed of 200 meters per minute, in a zone subjacent the die plate wherein the air was maintained at a temperature of 170° C. for a distance of about 60 cm. by means of a heating sheath. The filaments thus obtained have an average size of 70 deniers, and a stretchability at 100° C. of more than 1000 percent.

Figure 2:
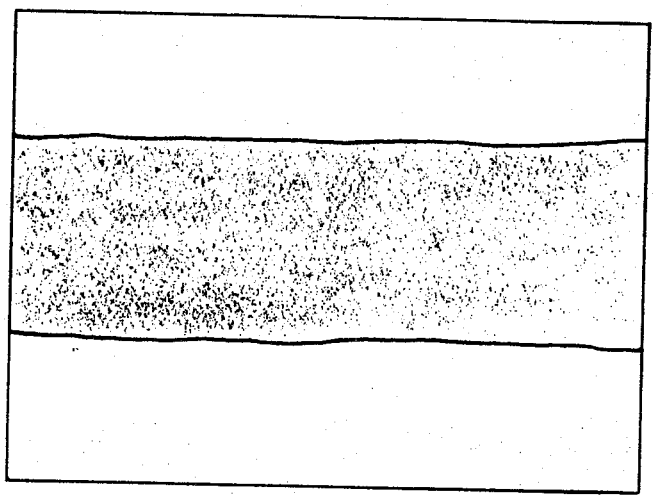
FIG. 2 is a view through the same microscope at the same enlargement as FIG. 1 of a fiber of polyvinyl chloride made in accordance with the invention after such fiber has undergone swelling.
Figure 3:
FIG. 3 shows a polyvinyl chloride fiber made from solution in accordance with the prior art.
Figure 4:
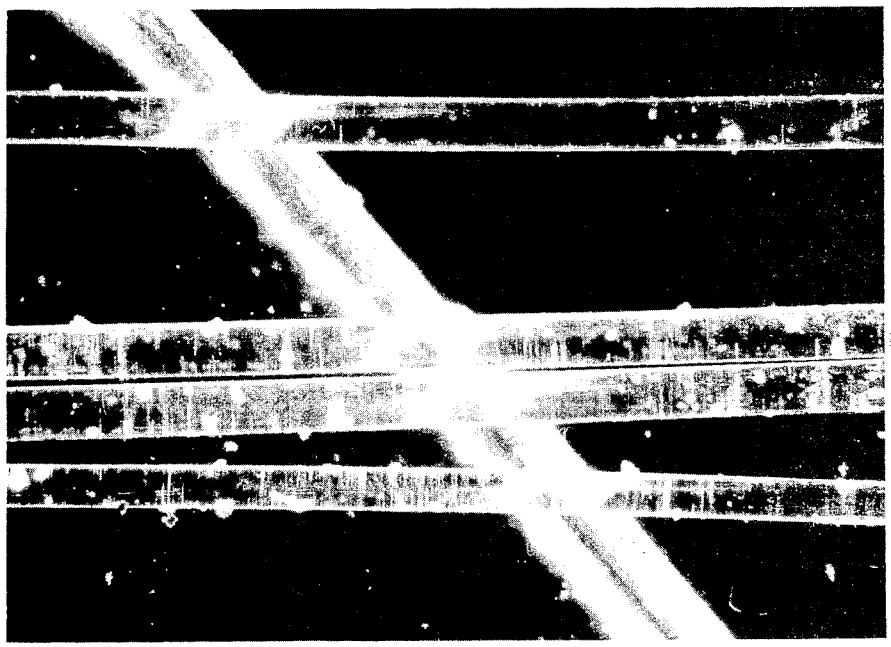
FIG. 4 shows a polyvinyl chloride fiber, at the same enlargement as FIG. 3, which was made in accordance with the present invention.

The fibers thus produced are perfectly homogeneous, and have no granular structure. This is shown in FIG. 2, which is a view at 200 diameter enlargement through a phase contrast microscope of a fiber of polyvinyl chloride made in accordance with the invention after such fiber had undergone swelling by dichloroethane at ambient temperature for 30 minutes. (Swelling in the classical manner by acetone is too small to permit a granular structure to appear if there were any).

FIG. 1 is a similar view at the same enlargement and in the same microscope as that employed in making FIG 2 of a fiber prepared from a solution of polyvinyl chloride in a mixture of equal parts by weight of carbon disulphide and acetone, such fiber being spun under dry conditions and swollen with acetone for 30 minutes at ambient temperature. FIG. 1 clearly shows the granular structure of the fiber; such granular structure lowers the resistance of the fiber to solvents, its stretchability, and its strength.

The remarkable differences between the fibers of FIGS. 1 and 2 are also shown by measurement of their birefringences. Fibers issuing from solution have a low birefringence $\Delta n < 10^{-3}$, such birefringence rising to values on the order of $3 \times 10^{-3}$ after the fibers have been drawn at 100° C. Polyvinyl chloride fibers made in accordance with the invention have values of birefringence which vary according to the conditions under which the fibers are drawn. Drawing of the fibers at 100° C. produces an appreciable molecular orientation in the fibers, as evidenced by values of $\Delta n$ of about $12 \times 10^{-3}$.

The inventors have also studied in a comparative manner filaments of polyvinyl chloride homopolymer, of the same composition as the two types of fibers described above, obtained by extrusion in a molten state in a conventional single screw extruder having a screw with a diameter of 30 mm. and length/diameter ratio equal to 15. The temperature of the polymer measured in the extruder was 210° C., while the temperature of the die plate was held at 225° C. The drawing of the filaments leaving the die plate was carried out under the same conditions as those described above. The filaments obtained had an average size of 120 deniers and had a maximum stretchability at 100° C. of 500 percent, only one-half that of fibers made in accordance with the invention. After such filaments have been swollen in dichloroethane, no trace of a granular structure can be detected in them by optical microscope. Nevertheless, such filaments have qualities which are inferior to those of filaments made in accordance with the invention, and are no better than those of filaments obtained from solutions of polyvinyl chloride in accordance with prior art, particularly as to their stretchability between 95° and 120° C. and the strength of the oriented filaments. Because of their low stretchability, filaments made by a screw type extruder can not be made with sizes of less than about 20 deniers.

In Table 1 below there is set forth, by way of non-limiting examples, a summary of the comparative properties of three types of fibers made from the same polyvinyl chloride composition : (1) fibers made from a solution, (2) fibers made by extrusion from a screw type extruder, and (3) fibers made in accordance with the invention.

Table 1 shows that extrusion in a screw-extruder at 210° C. does not permit the production of fibers having the same quality as the fibers made according to our invention, in particular as to stretchability and ultimate strength. An important characteristic of our invention is the extremely rapid melting and homogenizing procedure in order to obtain a stream of molten polymer of relatively high temperature which is higher than 200° C., the melting temperature of the crystallites in commercial polyvinyl chloride.

Another characteristic of the invention is to maintain the polymer leaving the spinnerette at a sufficiently high temperature which is at least 170° C., during the drawing and before cooling, in order to obtain a high stretchability at 100° C.

TABLE 1.—(EXAMPLES 1–6)

| Polyvinyl chloride polymerized in bulk index of viscosity-80 Afnor average molecular mass, in number, 37,500, in weight, 70,000 | Filaments obtained by "dry spinning" from a solution in a mixture of carbon disulphide-acetone | | Filaments obtained by extrusion in a single screw extruder at 210° C. | | Filaments obtained in accordance with the invention by extruding in a plate extruder at 250° C. | |
|---|---|---|---|---|---|---|
| | Non-oriented | After drawing at 100° C. | Non-oriented | After drawing at 100° C. | Non-oriented | After drawing at 100° C. |
| Size (denier) | 25–40 | 5–10 | 100–150 | 20–30 | 40–120 | 5–10 |
| Stretchability at 100° C. (times original length) | 4–5 | | 4–5 | | 8–12 | |
| Strength (g./denier) | 0.5 | 2.0–2.5 | 0.5 | 2.0–3.0 | 0.5 | 3.5–4.5 |
| Elongation to rupture, percent | 250 | 15–25 | 250 | 15–25 | 300–400 | 15–25 |
| Shrinkage in perchlorethylene at 60° C. of drawn filament fixed and retracted at 100° C. (percent) | | 20–30 | | 5–7 | | 2–4 |

The following additional examples further illustrate the invention without detracting from the generality of what is elsewhere herein stated.

EXAMPLE 7

Granules of polyvinyl chloride of viscosity index 80 stabilized with a standard stabilizer flow in a stream toward a small but powerful homogenizer in which they are homogenized and fluidified at 220° C. The stream of molten polyvinyl chloride is immediately forced through a spinnerette having 350 holes of 1.5 mm. diameter, the spinnerette being held at 200° C. The passage through the extrusion apparatus took 10–15 seconds and the fibers issuing from it were drawn at 50 m/min. A thermal conditioning zone was provided at the discharge part of the spinnerette which permitted the drawing to be completed before the fibers were cooled to set temperature. Ordinary drawing and winding apparatus was used. Microscopic examination showed orientation, a diameter of 105 microns, and a value of 122 deniers. The section was uniformly circular. The following characteristics were determined:

| | |
|---|---|
| Heat loss 15 H at 60° C | 0 % |
| Stretch in boiling water | 210 % |
| Shrinkage in boiling water after being set | 47 % |
| Shrinkage in oil at 120° C | 16 % |
| Shrinkage in perchlorethylene at 60° C. | 2 % |
| Shrinkage in trichlorethylene at 50° C. | 20 % |
| Strength of the undrawn fiber | 0.77 g/denier |
| Elongation at rupture | 86 % |
| Strength of the drawn and set fiber | 1.82 g/denier |
| Elongation of the drawn and set fiber | 35 % |
| Resistance of the set fiber released in boiling water | 1.07 g/denier |
| Elongation of the drawn set, and released fiber | 142 % |

Under the microscope at magnification of 80 ×, tested by a micrometric scale, the fibers were of substantially uniform diameter throughout their lengths. Against a black background they are seen to be transparent, and of great brilliance. The fibers made according to the prior art from solutions, viewed and tested alike, have irregular diameter, zones of striction and strangulation, and varying degrees of brilliance from point to point.

EXAMPLE 8

The apparatus of U.S. Pat. No. 3,411,180 was used, its speed accelerated to 180 rpm. and it was supplied with polyvinyl chloride of index of viscosity 80 which had been stabilized with a standard prior art stabilizer; a fluid, homogeneous flow was obtained. The mean time of the flow in the extruder was 10–15 seconds. The flow was passed through a spinnerette heated to 220° C., drawing of the fibers at discharge was at 250 m/min. The fibers were cooled and gathered by classic methods. The fibers were as above, oriented, brilliant, of circular cross section, and uniform with a mean diameter of 26 microns and a titre of 31 deniers. Their properties were:

| | |
|---|---|
| Titre of undrawn fibers | 31 deniers |
| Loss on heating 15 H at 60° C | 0 % |
| Stretch in boiling water | 200 % |
| Shrinkage in boiling water after drawing and setting | 40 % |
| Shrinkage in oil at 120° C., of drawn and set fibers | 15 % |
| Shrinkage in trichlorethylene at 50° C | 20 % |
| Strength, of drawn and set fibers | 2.2 g/denier |
| Elongation, of drawn and set fibers | 24 % |
| Elongation after drawing, setting and shrinkage | 100 % |

EXAMPLE 9

The conditions precedent were followed but a copolymer of vinyl chloride and propylene (95/5) was used. The same brilliance and uniformity was observed. The properties were:

| | |
|---|---|
| Titre | 25 deniers |
| Loss at 60° C after 15 H | 0 % |
| Stretch in boiling water | 200 % |
| Shrinkage in boiling water of the fibers drawn and fixed | 45 % |
| Shrinkage in oil at 120° C of drawn and fixed fibers | 34 % |
| Shrinkage in trichlorethylene | 30 % |
| Strength, of drawn and fixed fibers | 1.9 g/denier |
| Elongation at rupture of drawn and fixed fibers | 30 % |
| Elongation at rupture of drawn, fixed, and retracted fibers | 1.1 g/denier |
| Elongation at rupture of drawn, fixed, and retracted fibers | 130 % |

EXAMPLE 10

The apparatus employed had a small but high speed mixer, a short tube leading from the mixer to the spinnerette which was heated to 200° C., the spinnerette being heated to 220° C. A powder of mixed grains of polyvinyl chloride and polypropylene (90 to 10 percent) was supplied to the mixer and forced through the spinnerette. The speed of the extruded fibers measured after drawing was 150 meters per minute. The spinnerette had 200 rectangular holes 3 mm on one side and 1.2 mm on the other. Total time of heating approached 25 seconds. The temperature employed approached 220° C. The fibers were of uniform section, had a titre of 35 deniers, had high and uniform luster, and retained their uniformity when drawn. Tests revealed the following properties:

| | |
|---|---|
| Titre of undrawn fibers | 35 deniers |
| Weight loss at 60° C after 15 H | 0 % |
| Stretch in boiling water | 220 % |
| Shrinkage of the drawn and set fibers in boiling water | 32 % |
| Further shrinkage in oil at 120° C | 20 % |
| Shrinkage in trichlorethylene at 50° C | 32 % |
| Strength of the drawn and set fiber | 2.75 g/denier |
| Elongation of the same at breaking | 20 % |
| Strength of the drawn, set and shrunk fiber | 1.8 g/denier |
| Elongation of the same at rupture | 70 % |

EXAMPLE 11

The apparatus used was that which is described in the U.S. Pat. No. 3,411,180; a copolymer of vinylchloride and propylene (95-5) was extruded through a spinnerette having 150 holes of three lobes which produced a fiber having three longitudinal channels. Each hole had 0.55 sq. millimeter of orifice. The fibers extruded were of the exact size and shape of the holes. Cooling was in the air after drawing. Drawing was between 80° and 100° C.

It is to be understood that there are optimum conditions for each type of fiber, related to composition and molecular weight. This fiber has these properties:

| | |
|---|---|
| Undrawn fiber | 40 deniers |
| Loss at 60° C in 15 H | 0 % |
| Stretch in boiling water | 200 % |
| Shrinkage of drawn and set fiber in boiling water | 46 % |
| Shrinkage in oil at 120° C of the foregoing | 35 % |
| Shrinkage in trichlorethylene at 50° C | 31 % |
| Strength of drawn and set fiber 1.7 g/denier | |
| Elongation at rupture | 30 % |
| Strength of shrunk fiber | 0.99 g/denier |
| Elongation of stretched set and shrunk fiber at rupture | 130 % |

Example 12

Conditions were as in Ex. 11 but the spinnerette had 350 circular holes 1.5 mm in diameter and the resin was a 90–10 mixture of polyvinyl chloride and polypropylene, not a copolymer. The spinnerette was at 220° C. and drawing was at 250 m/min. The fibers tested thus:

| | |
|---|---|
| Undrawn fibers | 28 deniers |
| Loss at 60° C at 15 H | 0 % |
| Stretch in boiling water | 230 % |
| Shrinkage of the drawn and set fiber in boiling water | 30 % |
| Shrinkage in oil at 120° C of the drawn, set, and shrunken fiber | 18 % |
| Shrinkage in 50° C trichlorethylene 30 % | |
| Strength of the drawn and set fiber | 3.5 g/denier |
| Elongation at rupture of the drawn and set fiber | 20 % |
| Strength of the drawn, set and shrunken fiber | 2.05 g/denier |
| Elongation of the foregoing at rupture | 70 % |

EXAMPLE 13

Using conditions similar either to Ex. 12 and a mixture of 95 percent by weight polyvinyl chloride and 5 percent polymethylmethacrylate produced fibers having the qualities:

| | |
|---|---|
| Undrawn | 36 deniers |
| Loss on heating | 0 % |
| Stretch in boiling water | 200 % |
| Shrinkage after drawing and setting | 45 % |
| Shrinkage in hot oil after shrinkage in hot water | 32 % |
| Shrinkage in trichlorethylene at 50° C | 30 % |
| Strength of the drawn and set fiber | 2.5 g/denier |
| Elongation at rupture | 24 % |
| Strength after setting and retraction | 1.15 g/denier |
| Elongation of the foregoing at rupture | 100 % |

EXAMPLE 14

Fabrics have been made on one hand with the novel fibers and on another hand with the fibers prepared according to a process of the prior art. In both cases pure polyvinyl chloride has been used in the fibers.

Fibers have been spun according to the novel process from polyvinyl chloride of index of viscosity 80. Each fiber had a titre of 4.1 deniers after having been drawn at 950 m/min.

These fibers have been used to prepare yarns themselves woven to form a fabric of the canvas type having the following characteristics:

| | | |
|---|---|---|
| weight | | 140 g/sq.m. |
| Warp: | titre | 200/64 deniers |
| | twisting | 50 r/m Z |
| | number of threads | 28/cm |
| FillingL: | titre | 200/64 deniers |
| | twisting | 50 r/m Z |
| | number of threads | 25/cm |
| Strength measured according to the French Norm | | G 07001 |
| | warp | 125 Kg |
| | filling | 107 Kg |
| Sizes stability after 30 mn in perchlorethylene at 25°C | | |
| | shrinkage:warp | less than 1 % |
| | filling | 0 |
| After 30 mn in trichlorethylene at 25°C : | | |
| | shrinkage:warp | 18 % |
| | filling | 13.5 % |

A same fabric made with fibers of equal sizes but prepared according to the prior art, has the following characteristics:

| | | |
|---|---|---|
| strength:warp | | 71,4 Kg |
| filling | | 62,7 Kg |
| Size stability after 30 mn in perchlorethylene at 25°C | | |
| shrinkage:warp | | 6 % |
| filling | | 2 % |
| After 30 mn in trichloroethylene at 25°C : | | |
| shrinkage:warp | | 30 % |
| filling | | 22.5 % |

The fibers are useful in all types of fabric, rugs, curtains, cloth and in all situations where thermoplastic fibers are useful.

The fibers are the first of polyvinyl chloride base which are uniform in their useful properties, for instance having homogeneous composition, uniformity of size and strength, resistance to chemicals such as halogenated hydrocarbon solvents and uniformity of thermal response. In appearance either by naked eye, by magnification, or by photography the homogeneity and uniformity are superior to anything previously known. In cases involving mixtures of resins as distinguished from copolymers, homogeneity of composition may be lacking in appearance, two or more phases being visible under the microscope, but homogeneity of properties is still present even in cases where the resins used were previously deemed too incompatible to be used together. In shape, total superiority is established because the resins can be extruded in the exact shape desired, which was totally impossible with solvent systems of manufacture. Exact reproducibility of any fiber in composition, appearance, and shape is achieved by this invention, a fact which in itself vastly extends the use of polyvinyl chloride polymers and mixtures.

The new fibers may be flexible or stiff, thick or thin, solid or tubular, depending on the construction of the extrusion orifice. The shapes may be pellicular, e.g. like ribbons, and of all other shapes of equal or different transverse and vertical dimensions.

Modifiers may be included during the mixing, such as are normally used with such compositions, for instance, plasticizers and fillers. Inclusion of materials such as solvents capable of creating voids, is to be avoided except when, for reasons pertaining to appearance, voids are desired in the fiber, in which case loss of novel properties is to be expected.

The novel fibers when extruded as pure resins are normally transparent and of high luster. Delustering agents heretofore satisfactory with polyvinyl chloride may be included before or after extrusion. In cases where mixed resins produce a plurality of phases, novelty of attractive appearance follows, sometimes accompanied by internal reflection and refraction of light.

The physical and chemical characteristics of the novel products having an indeterminate dimension and minimum section are superior to anything previously known in materials of polyvinyl chloride base, compared composition to composition.

The foregoing description is exemplary, not limitive.

What is claimed is:

1. Melt-spun fibers of a polyvinyl chloride resin, which are homogeneous in composition and appearance, transparent when viewed against a black background under magnification, free from voids, and when viewed under a microscope appear of uniform cross-section throughout their length and show no granular structure, said fibers being drawable at 100° C. from substantially greater than 5 times to 8 to 12 times.

2. Melt-spun fibers according to claim 1, which have been drawn while hot and have been set, and which have a shrinkage when heated in perchlorethylene at 60° C. of 2 to 4 percent.

3. Melt-spun fibers according to claim 1 which have a stretchability of 1000 percent at 100° C. and average titre of 70 deniers.

4. Melt-spun fibers according to claim 1 which have been hot drawn to a 5 to 10 deniers titre and which have a strength of from 3.5 to 4.5 grams per denier.

5. Melt-spun fibers according to claim 1 which have been drawn at 100° C. and exhibit a specific index of birefringence of $12 \times 10^{-3}$.

6. Melt-spun polyvinyl chloride fibers which are homogeneous in composition and appearance, free from voids and from zones of striction and strangulation, transparent against a black background and of great brilliance and which have a uniform section along the length when viewed under a microscope, said fibers being drawable at 100° C. from substantially greater than 5 times to 8 to 12 times.

7. Drawn melt-spun polyvinyl chloride fibers which are homogeneous in composition and appearance and which have been drawn to at least ten times their extruded length, and which are transparent and which show no granular structure under the electronic microscope and which have a uniform cross-section along the length when viewed under the microscope.

8. Drawn melt-spun polyvinyl chloride fibers according to claim 7, which have been drawn at 100° C. exhibiting a molecular orientation as evidenced by a specific index of birefringence of $12 \times 10^{-3}$.

* * * * *

UNITED STATES PATENT OFFICE
CERTIFICATE OF CORRECTION

Patent No. 3,673,167  Dated June 27, 1972

Inventor(s) CLAUDE LEDOUX and ALBERT DE VRIES

It is certified that error appears in the above-identified patent and that said Letters Patent are hereby corrected as shown below:

Column 1 on the TITLE PAGE, "[72]", line 1, change "Ledous" to -- Ledoux --. Column 7, line 25, change "trichlorethyle ne at 25°C:" to -- trichlorethylene at 25°C. --; line 39, change "trichloroethyle- ne at 25°C." to -- trichlorethylene at 25°C. --.

Signed and sealed this 1st day of May 1973.

(SEAL)
Attest:

EDWARD M. FLETCHER, JR.  ROBERT GOTTSCHALK
Attesting Officer  Commissioner of Patents